Aug. 21, 1923.

S. H. CLAPP

BRAKE

Filed Nov. 10, 1922

INVENTOR
Stuart H. Clapp
BY
W. N. Roach
ATTORNEY

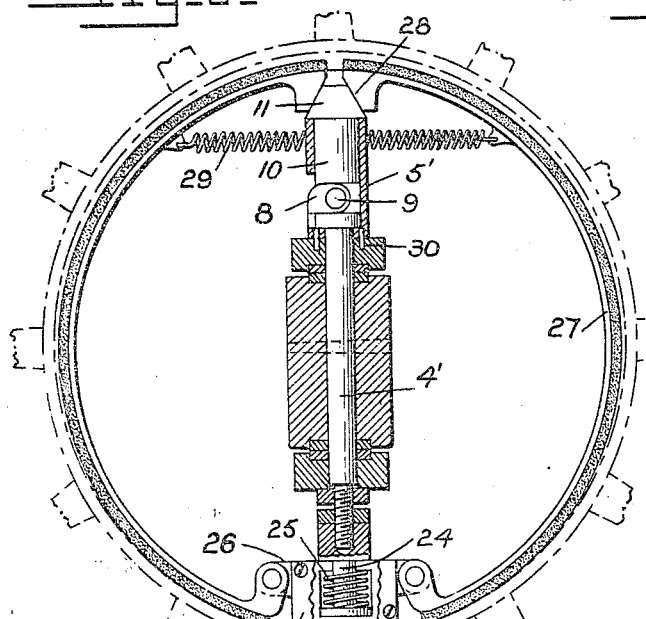
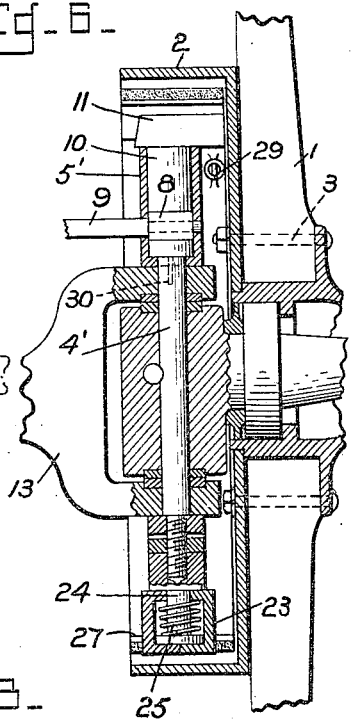
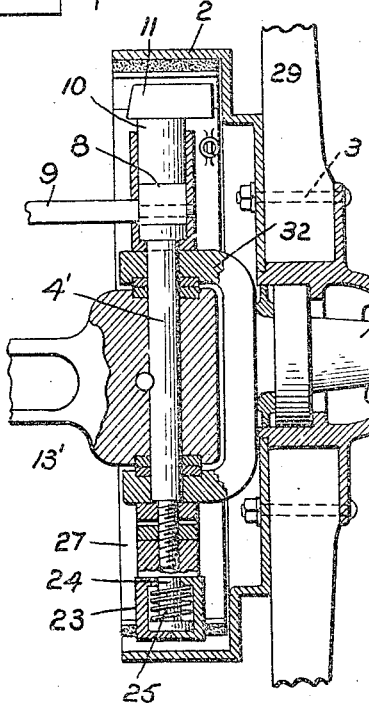
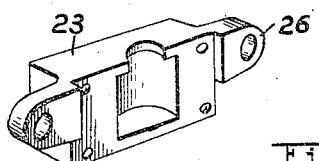
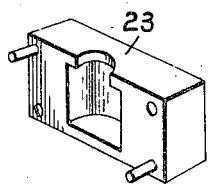
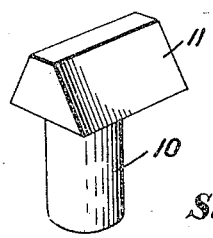
INVENTOR
Stuart H. Clapp
BY
W. N. Roach.
ATTORNEY Patented Aug. 21, 1923.

1,465,509

UNITED STATES PATENT OFFICE.

STUART H. CLAPP, OF CAMP MEADE, MARYLAND.

BRAKE.

Application filed November 10, 1922. Serial No. 600,103.

*To all whom it may concern:*

Be it known that I, STUART H. CLAPP, a citizen of the United States, and a resident of Camp Meade, county of Anne Arundel, and State of Maryland, have invented an Improvement in Brakes, of which the following is a specification.

The subject of this invention is a brake designed, primarily, for use on the steering wheels of a vehicle.

In driving a vehicle, especially one of considerable weight, it is often difficult to bring the vehicle to a quick stop owing to the fact that the sole braking effect is produced by the driving wheels.

To increase the braking effect it is desirable that the steering wheels also be provided with brakes and, in order to accomplish this it is necessary that the braking mechanism be so designed that the brake may be thrown into contact with the brake drum in whatever angular position the drum may be set due to the angular movement of the wheel in steering.

The present invention has been devised to accomplish the foregoing objects in a simple and efficient manner, generically, by placing a drum on the steering wheel and mounting brake shoes and shoe actuating means to oscillate about the axis of oscillation of the wheel during steering.

With these and other objects in view my invention resides in the novel arrangement and combination of parts and in the details of construction hereinafter described and claimed, it being understood that changes in the precise embodiment of the invention herein disclosed may be made without departing from the spirit of the invention.

Practical structures for carrying out the invention are shown, by way of illustration, in the accompanying drawings, wherein:—

Figure 5 is an enlarged view in elevation, partly in section, of a modification useful when the steering knuckle pintle is locked to the stub axle cross head;

Figure 6 is a vertical sectional view taken at right angles to the plane of Figure 5;

Figure 7 is a similar view illustrating how this modified form might be used when the pintle is keyed to the front axle;

Figures 8 and 9 are detail perspectives of the cross head to which the brake shoes are hung; and Figure 10 is a similar view of the plunger.

Figure 1:
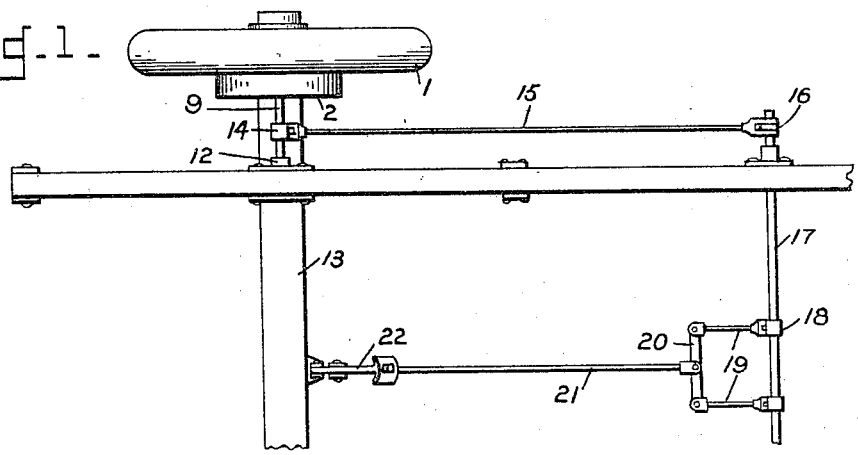
Figure 1 is a plan view of a fragment of a chassis with a brake constructed in accordance with my invention in place thereon.
Figure 2:
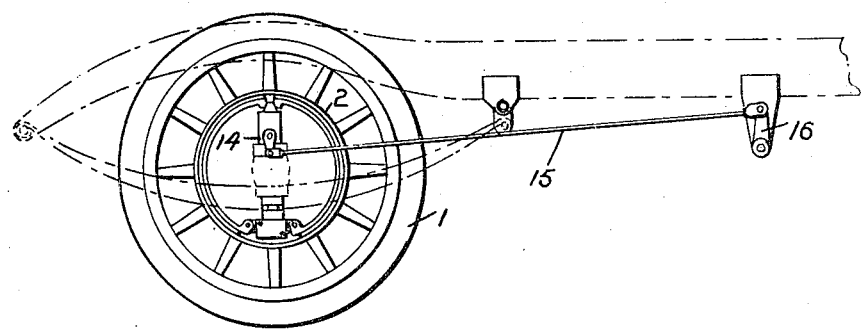
Figure 2 is a view in elevation of the brake, a portion of a chassis represented in broken and dotted lines.

Referring to the drawings by numerals of reference:

In carrying out my invention I attach to the steering wheels 1 of a motor vehicle a drum 2, the drum being attached in any suitable manner, as by bolts 3, the drum being of sufficient extent to intersect the axis, extended, about which the wheel oscillates during steering.

I provide a pintle 4 for the steering knuckle on which is formed or to which is connected an enlarged head 5, in which is provided a recess 6 to permit assembling of the parts. An axial bore 7 and a diametrical bore are also formed in the head and both are in communication with the recess.

Mounted in the recess is a cam 8 carried on a cam shaft 9 with which it is constrained to oscillate or rock, the shaft being journaled in the diametrical bore. A plunger 10 is mounted for reciprocation in the axial bore 7 and seats upon the cam, the plunger being formed with a wedge shaped, preferably offset head 11 which is adapted to enter between and expand the brake shoes, as will soon be described.

The shaft 9 may have its extending end journaled in a bracket 12, secured to the axle 13, and have secured thereon a crank 14 which is connected by a rod 15 to a crank 16 carried on a rock shaft 17, which shaft is connected through cranks 18, links 19, cross head 20 and connecting rod 21 to the pedal lever 22 of the service brakes. As will be understood, the service brakes in this instance are also connected to the rock shaft 17 by cranks and rods, not shown.

To the lower end of the pintle 4 is hung a cross head 23, which has a central recess for the reception of a headed end piece 24, which may be conveniently threaded on the end of the pintle and which is surrounded by a resilient element, such as the coiled spring 25, which is confined between the head of the piece and the top of the cross head and so retains the cross head in proper elevated position to prevent dragging of the brake shoes.

In order to properly hang the brake shoes, the cross head may be provided with apertured lugs 26—26 to which are pivoted ends of brake shoes 27, the other ends 28 of which are angled off to present faces inclined to the inclination of the wedge shaped head 11 of the plunger, so that, when the plunger is elevated through rocking of the cam the wedge shaped head, entering between the ends of the shoes, forces the shoes outwardly against the drum, thereby retarding rotation of the drum and wheel. The brake shoes may be held in their normal retracted position, out of contact with the drum by suitable means, such as the retractile spring 29.

When the construction of the vehicle is such that the pintle 4' of the steering knuckle is pinned to the stub shaft cross head and oscillates therewith, as shown in Figures 5 and 6, the enlarged head 5' may conveniently be formed separate from the pintle and drilled for the pintle to pass therethrough, the enlarged head being held in place by the pintle head and retained from oscillation with the pintle by suitable means, such as dowels 30 which enter apertures formed in the head and axle, respectively.

Figure 3:
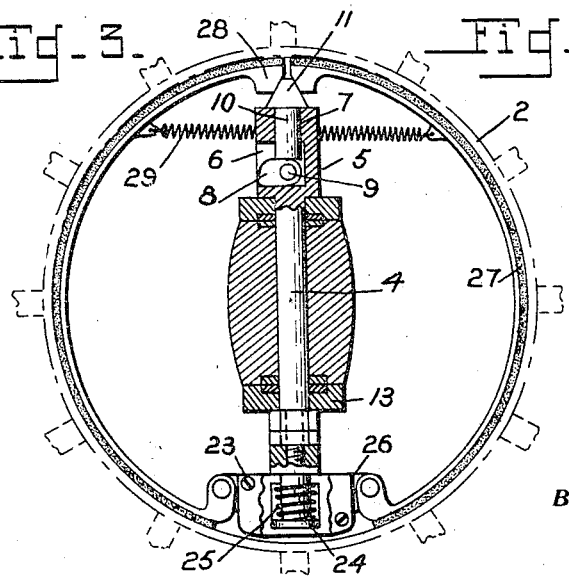
Figure 3 is an enlarged view in elevation of the brake, parts being in section.
Figure 4:
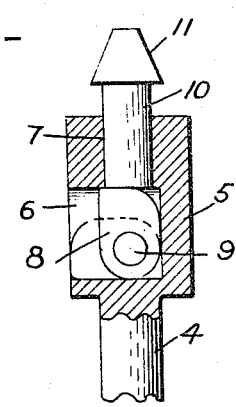
Figure 4 is a detail sectional view, partly in elevation, of the brake actuating cam and plunger.

When the pintle is secured to the axle and the stub axle formed with a yoke or Y to embrace the end of the main axle 13', as shown in Fig. 7, the enlarged head 5' may be made as shown in Figures 5, 6 and 7, separate from the pintle 4', or may be made as shown in Figures 3 and 4, integral with the pintle.

I claim:

1. The combination with a vehicle, including chassis side bars, a steering wheel, and steering knuckle, of a brake drum on the steering wheel, the rim of the drum intersecting the axis of oscillation of the steering knuckle, a pintle for the steering knuckle, an enlarged head on the pintle provided with a recess, an axially disposed bore communicating with the recess and a bore at right angles to the axially disposed bore, a plunger in the axially disposed bore formed with an offset wedge shaped head, a rod extending through the second bore, a cam on the rod positioned in the recess and operable to reciprocate the plunger, a cross head hung from the lower end of the pintle, yielding means in the cross head for retaining the head in elevated position, brake shoes pivoted to the cross head, the upper ends of said brake shoes formed to receive the wedge shaped head of the plunger and means for rocking the rod and cam to reciprocate the plunger and force the brake shoes into contact with the drum.

2. The combination of a brake drum, a pintle about which the drum is oscillatable, a head connected to the pintle having an axial bore, a plunger reciprocable in the bore, brake shoes within the drum, the plunger operable to force the brake shoes into contact with the drum, and means for operating the plunger.

3. The combination of a brake drum, a pintle about which the drum is oscillatable, a head connected to the pintle having an axial bore, a plunger reciprocable in the bore, brake shoes within the drum, the plunger operable to force the brake shoes into engagement with the drum, a cam in the head, and means for rocking the cam to operate the plunger.

4. The combination with a brake drum and a pintle about which the drum is oscillatable, of a cross head hung from the pintle, yielding means urging the cross head toward elevated position, brake shoes pivoted to the cross head and means carried by the pintle operable to force the shoes into contact with the drum.

STUART H. CLAPP.